US012679371B2

(12) United States Patent
Benaziz et al.

(10) Patent No.: US 12,679,371 B2
(45) Date of Patent: Jul. 14, 2026

(54) PATH CALCULATION MODULE, AND ASSOCIATED PATH CONTROL DEVICE AND METHOD

(71) Applicant: RENAULT S.A.S, Boulogne Billancourt (FR)

(72) Inventors: Marouane Benaziz, Cesson-Sevigne (FR); Maud Peyret, Massy (FR)

(73) Assignee: AMPERE S.A.S., Boulogne Billancourt (FR)

( * ) Notice: Subject to any disclaimer, the term of this patent is extended or adjusted under 35 U.S.C. 154(b) by 200 days.

(21) Appl. No.: 18/262,461

(22) PCT Filed: Jan. 11, 2022

(86) PCT No.: PCT/EP2022/050383
§ 371 (c)(1),
(2) Date: Jul. 21, 2023

(87) PCT Pub. No.: WO2022/157032
PCT Pub. Date: Jul. 28, 2022

(65) Prior Publication Data
US 2024/0092364 A1    Mar. 21, 2024

(30) Foreign Application Priority Data
Jan. 25, 2021    (FR) ...................................... 2100689

(51) Int. Cl.
*B60W 30/18*        (2012.01)
*B60W 60/00*        (2020.01)
*G05D 1/00*          (2024.01)
(52) U.S. Cl.
CPC ... *B60W 30/18163* (2013.01); *B60W 2520/12* (2013.01); *B60W 2552/10* (2020.02)

(58) Field of Classification Search
CPC ....... B60W 30/18163; B60W 2520/12; B60W 2552/10; B60W 60/001; B60W 50/0098;
(Continued)

(56) References Cited

U.S. PATENT DOCUMENTS

2007/0233386 A1*  10/2007  Saito ...................... G08G 1/165
                                                           701/117
2017/0291638 A1*  10/2017  Gupta ................. B60W 40/103
(Continued)

FOREIGN PATENT DOCUMENTS

CN          110597245 B        11/2020

OTHER PUBLICATIONS

English translation of International Search Report issued May 2, 2022 in PCT/EP2022/050383, 3 pages.
(Continued)

*Primary Examiner* — Hossam M Abd El Latif
(74) *Attorney, Agent, or Firm* — Oblon, McClelland, Maier & Neustadt, L.L.P.

(57) ABSTRACT

A module includes a device for transmitting a first setpoint state vector as the input to a closed control loop of a path control device such that the vehicle travelling in a first lane moves to a second lane, the path being modelled by a first Bezier curve, and a device for modelling, using a second Bezier curve, a path for returning the vehicle to the middle of the first lane when the lane change is aborted. The second Bezier curve is parameterized using the lateral position and the lateral speed of the lane change path for changing from the first lane to the second lane at the time when the lane change is aborted.

9 Claims, 3 Drawing Sheets

(58) Field of Classification Search
CPC . B60W 2554/4041; B60W 2554/4042; B60W
2554/804; B60W 2540/215; B60W
2554/802; G08G 1/167; G08G 1/16;
G05D 1/0212
USPC ......................................................... 701/26
See application file for complete search history.

(56) References Cited

U.S. PATENT DOCUMENTS

| | | | |
|---|---|---|---|
| 2018/0281804 A1 | 10/2018 | Talamonti et al. | |
| 2018/0281854 A1 | 10/2018 | Talamonti et al. | |
| 2018/0281855 A1 | 10/2018 | Talamonti et al. | |
| 2018/0281856 A1 | 10/2018 | Talamonti et al. | |
| 2018/0284266 A1* | 10/2018 | Talamonti | G08G 1/167 |
| 2018/0286242 A1 | 10/2018 | Talamonti et al. | |
| 2018/0348767 A1* | 12/2018 | Jafari Tafti | G08G 1/166 |
| 2022/0126824 A1* | 4/2022 | Kato | B60W 10/20 |
| 2022/0204041 A1* | 6/2022 | Oh | B60W 30/18154 |

OTHER PUBLICATIONS

French Preliminary Search Report Issued Apr. 30, 2021 in French
Application 21 00689 (with English Translation of Categories of
Cited Documents), 4 pages.
Zheng, H. et al., "Investigation of a Longitudinal and Lateral
Lane-Changing Motion Planning Model for Intelligent Vehicles in
Dynamical Driving Environments", IEEE Access, vol. 7, Jan. 1,
2019, pp. 44783-44802, XP055766181.
Korzeniowski, D. et al., "Method of planning a reference trajectory
of a single lane change manoeuver with Bezier curve", IOP Con-
ference Series: Materials Science and Engineering, vol. 148, Sep. 1,
2016, pp. 1-10, XP55765061.
Bae, I. et al., "Lane Change Maneuver based on Bezier Curve
providing Comfort Experience for Autonomous Vehicle Users",
2019 IEEE Intelligent Transportation Systems Conference (JTSC),
IEEE, Oct. 27, 2019, pp. 2272-2277, XP033668181.

* cited by examiner

Fig. 1
PRIOR ART
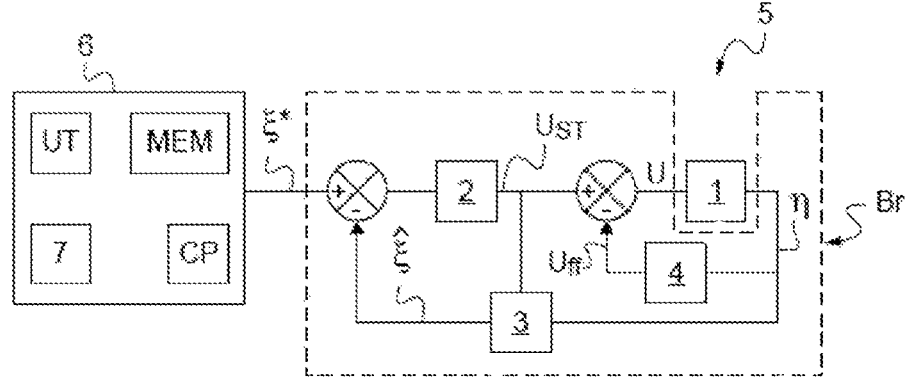
Fig. 2
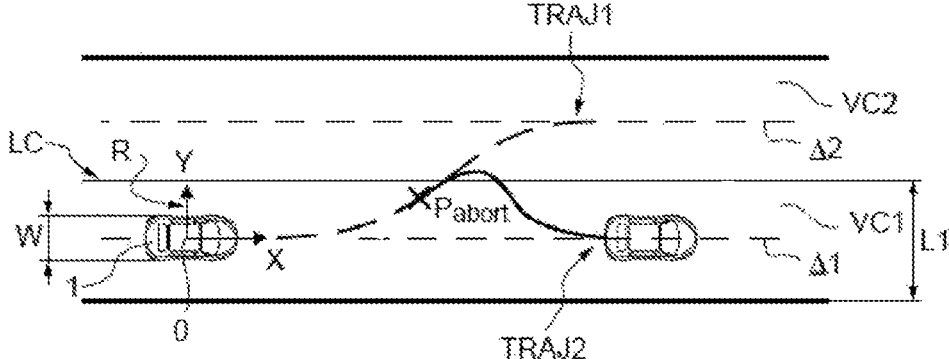
Fig. 3

PATH CALCULATION MODULE, AND ASSOCIATED PATH CONTROL DEVICE AND METHOD

BACKGROUND

The present invention relates to a path control device for a motor vehicle.

The present invention relates more particularly to a device for controlling, in real time, the path of a motor vehicle during a change in path, for example during a change of traffic lane, to a path calculation module integrated into the device and to a method for implementing such a device.

Some motor vehicles are equipped with path control devices designed in such a way that they make it possible to assist the driver with keeping the vehicle in the lane in which it is traveling, notably with keeping the vehicle in the center of the lane. Autonomous vehicles in which driving is entirely delegated to the vehicle may also be equipped with such devices. They act on the direction of the vehicle by modifying the steering angle of the steered wheels of the vehicle.

Such devices may also make it possible for the vehicle to change traffic lanes semi-autonomously when the driver of the vehicle actuates, for example, a turn signal and modifies the position of the steering wheel, or autonomously, the instant for changing traffic lane being determined by the device.

FIG. 1 illustrates a device DISP for real-time path control applied to a front-wheel-drive motor vehicle 1 driven by an engine and comprising two steered wheels, preferably the front wheels of the vehicle, which are controlled by an actuator controlled by a control signal U.

Below, the operator $\dot{x}$ designates the time derivative of x.

The vehicle 1 further comprises a sensor intended to measure a travel parameter of the vehicle, such as the actual longitudinal speed V, the steering angle $\delta$ of the front wheels, the yaw rate $\dot{\Psi}$ of the vehicle or the direction angle.

The vehicle may further be equipped with a RaCam device combining the properties of an optical camera and of a radar, making it possible to provide a model of a direction line of the traffic lane of the vehicle in the form of a polynomial y(x), or with an optical camera making it possible to determine the polynomial y(x).

The vehicle 1 is equipped with an on-board computer comprising a controller device 2 for generating a control signal Ust so as to make a physical state vector $\xi$ of the vehicle conform to a setpoint state vector $\xi^*$ so that the vehicle 1 follows a desired path.

The on-board computer further comprises an observer 3 for generating, in real time, a path-following estimated state vector $\hat{\xi}$. This state vector is estimated for a speed V of the vehicle, on the basis of the command Ust and of a measurement vector $\eta$ of state variables which is correlated with the path-following physical state vector $\xi$ of the vehicle 1.

The aim of the observer device 3 is to generate, in real time, an estimated state vector $\hat{\xi}$ representing, as closely as possible, the effective state vector $\xi$, and implements a vehicle model known as the bicycle model.

The on-board computer further comprises an anticipator module 4 which adds a second steering command Uff, depending on a curvature $\gamma$ff of a bend, to the first steering command Ust produced by the device 2, so as to compensate for the bend.

The second steering command Uff makes it possible for the vehicle 1 to round the bend of curvature $\gamma$ff.

The second command is added to the command signal Ust, so that the controller device 2 controls the path of the vehicle 1 so that the vehicle 1 follows a straight route.

Consequently, the command signal U is equal to the sum of the first command Ust and of the second command Uff.

The device 2, the observer 3 and the module 4 form a closed control loop Br having the setpoint state vector $\xi^*$ as a setpoint.

The physical state vector $\xi$ of the vehicle is equal to:

$$\xi = \begin{pmatrix} \Psi \\ \dot{\Psi} \\ \dot{y}l \\ yl \\ \dot{\delta} \\ \delta \\ \int -yl \end{pmatrix} \tag{1}$$

where $\Psi$ is the relative heading angle between the axis of the vehicle and the tangent to the reference path, $\dot{y}l$ is the lateral speed of departure of the vehicle from the ideal path of the vehicle, yl is the lateral deviation between the center of gravity of the vehicle and the center of the lane of the vehicle and the tangent to the path in front of the vehicle, $\dot{\delta}$ is the variation in the steering angle and $\int -yl$ represents the integral of the lateral position.

The setpoint state vector $\xi^*$ is equal to:

$$\xi^* = \begin{pmatrix} \dot{\Psi}_{ref} \\ \Psi_{ref} \\ \dot{y}l_{ref} \\ yl_{ref} \\ \dot{\delta}_{ref} \\ \delta_{ref} \\ \int -yl_{ref} \end{pmatrix} \tag{2}$$

And the estimated state vector $\hat{\xi}$ is equal to:

$$\hat{\xi} = \begin{pmatrix} \dot{\Psi}_{est} \\ \Psi_{est} \\ \dot{y}l_{est} \\ yl_{est} \\ \dot{\delta}_{est} \\ \delta_{est} \\ \int -yl_{est} \end{pmatrix} \tag{3}$$

The vector $\xi$ is partially unknown as the internal state of the vehicle 1 is not fully accessible.

The observer 3 estimates the lateral speed of departure of the vehicle from the ideal path of the vehicle $\dot{y}l$ and the variation in the steering angle $\dot{\delta}$, the five state variables being measured.

The vector $\eta$ of current measurements contains five components:

$$\eta = \begin{bmatrix} \dot{\Psi} \\ \Psi \\ yl \\ \delta \\ \int -yl \end{bmatrix} \quad (4)$$

The yaw rate $\dot{\Psi}$ is measured by the yaw-rate sensor.

During a change of traffic lane, the setpoint state vector $\xi*$ is modified so that the device DISP controls the vehicle 1 in order for it to drift to the center of a traffic lane adjacent to the one in which the vehicle is moving in a way which is comfortable for the passengers of the vehicle.

During the change of lane, the driver or the device may decide to interrupt the maneuver and control the vehicle so that it returns to the center of the starting lane, for example following the appearance of an obstacle.

One solution for bringing the vehicle back to the center of the starting lane consists in injecting a null setpoint state vector as input to the closed control loop.

However, the jump in setpoint of the control loop Br, the dynamics of the controller device 2 seeking to follow the setpoint state vector so as to change traffic lane, and the deviation which is present between the vehicle and the first traffic lane may cause the vehicle to return to the center of the first traffic lane in a way which is uncomfortable for the passengers.

Reference may be made to the document US20180348767, which discloses a device for changing traffic lane implementing a path controller modeling a path by a Bézier curve.

The path during the change of direction lane depends on the speed profile of the vehicle, the determining of the path implementing a calculation of an optimum requiring significant computing means.

In addition, if the determined path is not compatible with the environment of the vehicle, the calculation of an optimum is reiterated.

Furthermore, the device does not disclose a strategy for abandoning the change of traffic lane.

Reference may additionally be made to the document entitled "Méthode de planification d'une trajectoire de référence avec une courbe de Bézier lors d'une manoeuvre de changement de voie [Method for planning a reference path with a Bézier curve during a maneuver for changing lane]" by D Korzeniowski and G Ślaski, which proposes a method for changing traffic lane implementing two symmetrical Bézier curves defining a path for changing traffic lane to two adjacent traffic lanes which are located on either side of the vehicle.

As the two curves are symmetrical and linked to one another, it is necessary to ensure continuity between the two curves.

In addition, it is necessary to calculate several paths on the basis of the Bézier curves so as to determine the optimal path for changing lane.

The proposed method requires significant computing means to ensure the continuity of the Bézier curves and determine the optimal path for changing lane.

Furthermore, the device does not disclose a strategy for abandoning the change of traffic lane.

The document WO2019/059829 discloses a method for determining a change of traffic lane implementing a path for changing lane determined by a system for changing traffic lane on the basis of the path induced by the driver and of a path determined by the system.

The change of traffic lane is triggered by the intervention of the driver.

However, this method requires the intervention of the driver and does not propose a strategy for abandoning the change of lane.

The document U.S. Pat. No. 9,796,421 discloses a lateral control device for a motor vehicle but does not disclose a method for changing traffic lane.

The device does not disclose a strategy for abandoning the change of traffic lane either.

The (unpublished) document FR 2004667 discloses a path control device for a motor vehicle.

A first Bézier curve models a path for changing the traffic lane of the vehicle.

When the maneuver for changing lane is abandoned, the device determines a second Bézier curve modeling a return path of the vehicle to the center of the traffic lane on the basis of parameters of the first Bézier curve and of the instant when the maneuver is abandoned.

However, it has been noted that the return path causes a large lateral movement of the vehicle which may be uncomfortable for the passengers.

It is therefore proposed to mitigate all or some of the drawbacks of the devices for changing traffic lane according to the prior art, notably by proposing a path control device determining a return path of the vehicle to the center of the traffic lane in which the vehicle is moving which is comfortable for the passengers.

BRIEF SUMMARY

In view of the above, one subject of the invention is a path control method for a motor vehicle, comprising:

controlling the vehicle on the basis of a first setpoint state vector during a change of traffic lane so that the vehicle traveling in a first traffic lane drifts into a second traffic lane in a predetermined duration, the path of the vehicle during the change of traffic lane being modeled by a first Bézier curve linking a value of a discretization parameter to a value of a first lateral deviation of the vehicle with respect to the center of a traffic lane and to a value of a time variable which is representative of the evolution of the change in path;

controlling the vehicle on the basis of a second setpoint state vector when the change of traffic lane is abandoned so that the vehicle traveling in the first traffic lane drifts to the center of said first lane, the return path of the vehicle to the center of the first traffic lane being modeled by a second Bézier curve parameterized on the basis of the value of the time variable at the instant when the change of lane is abandoned, of the value of the lateral deviation associated by the first Bézier curve with said value, and of parameters of the first Bézier curve.

The second Bézier curve is further parametrized on the basis of the lateral position and of the lateral speed of the path for changing traffic lane from the first lane to the second lane at the instant when the change of lane is abandoned.

According to one feature, modeling the return path of the vehicle to the center of the first traffic lane when the change of traffic lane is abandoned by a second Bézier curve comprises determining at least four control points of the second Bézier curve, each control point being identified by a value of the time variable and a lateral deviation value, the value of the time variable of a first control point being zero, and the lateral deviation value of the first control point being equal to the value of the lateral deviation associated by the first Bézier curve with the instant when the change of lane is abandoned, the value of the time variable of a second control point being determined on the basis of the value of the time variable of a control point of the first Bézier curve and of the instant when the change of lane is abandoned, and the lateral deviation value of the second control point being determined on the basis of the value of the time variable of a control point of the first Bézier curve, of the lateral position and of the lateral speed of the path for changing traffic lane at the instant when the change of lane is abandoned, and the third and fourth control points being determined so that the sum of the duration of the change of traffic lane made by the vehicle and of the duration of the return of the vehicle to the first traffic lane is equal to the predetermined duration.

Advantageously, the value of the time variable of the third control point is equal to the average of the values of the time variable of the second and fourth control points of the second Bézier curve.

Preferably, the maximum value of the time variable of the second control point is below or equal to a control threshold so that the vehicle does not cross the center line separating the first and second traffic lanes.

Advantageously, the control threshold is determined on the basis of the width of the traffic lane of the vehicle, of the width of the vehicle and of an adjustment threshold.

Another subject of the invention is a path calculation module for a motor vehicle, the module comprising:

means for transmitting a first setpoint state vector as input to a closed control loop of a path control device, the loop being configured to control the motor vehicle so that the vehicle traveling in a first traffic lane drifts into a second traffic lane in a predetermined duration, the path being modeled by a first Bézier curve linking a value of a discretization parameter to a value of a lateral deviation of the vehicle with respect to the center of a traffic lane in which the vehicle is moving and to a value of a time variable which is representative of the evolution of the change in path, the vector being determined on the basis of the lateral deviation, of the time variable and of the discretization parameter, means for modeling a return path of the vehicle to the center of the first traffic lane when the change of traffic lane is abandoned by a second Bézier curve on the basis of the value of the time variable at the instant when the change of traffic lane is abandoned, of the value of the lateral deviation associated by the first Bézier curve with said value, and of parameters of the first Bézier curve, means for determining a second setpoint state vector of the closed control loop of the path control device so that the vehicle returns to traveling in the center of the first lane, and means for transmitting the second setpoint state vector as input to the loop.

The second Bézier curve is further parametrized on the basis of the lateral position and of the lateral speed of the path for changing traffic lane from the first lane to the second lane at the instant when the change of lane is abandoned.

According to one feature, the second Bézier curve is parameterized by at least four control points, each control point being identified by a value of the time variable and a lateral deviation value, and the means for modeling a return path of the vehicle to the center of the first traffic lane when the change of traffic lane is abandoned being configured to determine the four control points so that:

the value of the time variable of a first control point is zero, and the lateral deviation value of the first control point is equal to the value of the lateral deviation associated by the first Bézier curve with the instant when the change of lane is abandoned, the value of the time variable of a second control point is determined on the basis of the value of a control point of the first Bézier curve and of the instant when the change of lane is abandoned, and the lateral deviation value of the second control point is determined on the basis of the value of the time variable of a control point of the first Bézier curve, of the lateral position and of the lateral speed of the path for changing traffic lane at the instant when the change of lane is abandoned, and the third and fourth control points are determined so that the sum of the duration of the change of traffic lane made by the vehicle and of the duration of the return of the vehicle to the first traffic lane is equal to the predetermined duration.

Preferably, the value of the time variable of the third control point is equal to the average of the values of the time variable of the second and fourth control points of the second Bézier curve.

Advantageously, the means for modeling a return path are further configured to determine a control threshold so that the vehicle does not cross the center line separating the first and second traffic lanes, and saturate the value of the time variable of the second control point so that the maximum value of said variable is below or equal to the control threshold.

Preferably, the means for modeling a return path are configured to determine the control threshold on the basis of the width of the traffic lane of the vehicle, of the width of the vehicle and of an adjustment threshold.

According to yet another aspect, another subject of the invention is a path control device comprising a path calculation module as defined above, and a closed control loop configured to successively receive as setpoints the first and second setpoint state vectors transmitted by the path calculation module, the control loop being further configured to control the motor vehicle so that it follows the paths modeled by the first and second Bézier curves.

BRIEF DESCRIPTION OF THE DRAWINGS

Other aims, features and advantages of the invention will become apparent on reading the following description, which is given merely by way of non-limiting example, and with reference to the appended drawings, in which:

FIG. 1, which has already been mentioned, schematically illustrates a real-time path control device of a vehicle, according to the prior art;

FIG. 2 schematically illustrates one embodiment of a path control device of a vehicle, according to the invention;

FIG. 3 illustrates one example of modeling a return path of the vehicle 1, according to the invention

DETAILED DESCRIPTION

Figure 4:
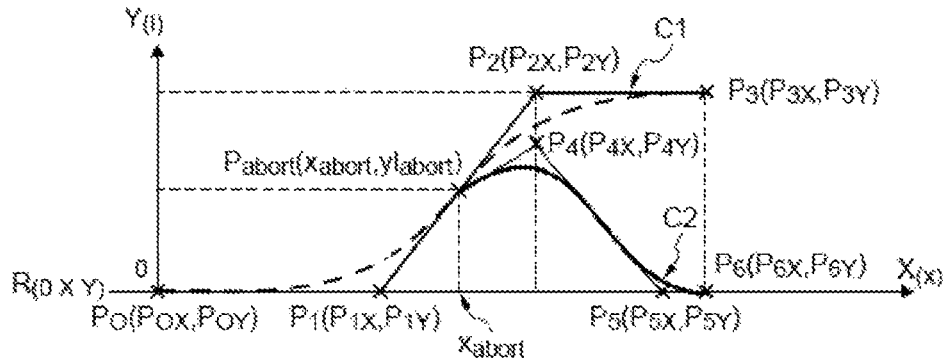
FIG. 4 is another illustration of the modeling of the return path of the vehicle 1 shown in FIG. 3.

FIG. 2 schematically shows one embodiment of a device 5 for controlling a path of the vehicle 1 according to one aspect of the invention. Elements of the device 5 which are identical to constituent elements of the device DISP of FIG. 1 bear the same references.

The device 5 comprises the closed control loop Br comprising the controller device 2 for generating the control signal Ust, the observer 3 for generating, in real time, the straight-lane-following estimated state vector $\hat{\xi}$ of the vehicle on the basis of the vector η of current measurements and the so-called "feedforward" control anticipator module 4 which adds the steering wheel angle value which is required to take the bend depending on the curvature of said bend, on the speed of the vehicle and on its parameters for generating the second steering command Uff.

The command Ust is equal to the value of a straight-path-following angle $\delta_{rect}$.

The device 5 further comprises a path control module 6 comprising means for determining the first setpoint state vector $\xi^*$ during a change of traffic lane and a second setpoint state vector $\xi^*_1$ when the change of traffic lane is abandoned so that the vehicle returns to the initial traffic lane.

The calculation module 6 comprises means for transmitting the first and second setpoint state vectors $\xi^*$ and $\xi^*_1$ as input to the control loop Br of the path control device 5 so that the vehicle 1 traveling in a first traffic lane VC1 drifts into a second traffic lane VC2 and returns to the first lane VC1 in a predetermined duration Tp, the predetermined duration being initially anticipated to be the duration of the change of lane.

The path TRAJ1 for changing from the first traffic lane (initial lane) VC1 to the second traffic lane VC2 is modeled by a first Bézier curve C1 linking a value of a first parameter S to a value of the lateral deviation yl of the vehicle 1 with respect to the center of the traffic lane in which the vehicle 1 is moving and to a value of a time variable x which is representative of the evolution of the change in path.

The first setpoint state vector $\xi^*$ is determined on the basis of the lateral deviation yl, of the time variable x and of the first parameter S.

The calculation module 6 further comprises means for modeling the return path TRAJ2 of the vehicle to the center of the first traffic lane VC1 when the change of traffic lane is abandoned, at a point labeled $P_{abort}$, by a second Bézier curve C2 on the basis of the value $x_{abort}$ of the time variable x at the instant when the change of lane is abandoned, of the value $yl_{abort}$ of the lateral deviation associated by the first Bézier curve P1 with said value $x_{abort}$, and of parameters of the first Bézier curve P1, the point $P_{abort}$ being defined by the values $x_{abort}$ and $yl_{abort}$.

The second Bézier curve C2 links a value of the first parameter S to a value of a second lateral deviation yl2 of the vehicle 1 with respect to the center of a traffic lane and to a value of the time variable x.

The duration of the change of lane made by the vehicle 1 up to the value $x_{abort}$ of the time variable x is labeled Tc and the duration of the return of the vehicle 1 to the center of the lane VC1 from the value $x_{abort}$ of the time variable x is labeled Tr, the sum of the two durations being equal to the duration Tp.

The module 6 comprises optical acquisition means 7 comprising, for example, an optical camera.

FIGS. 3 and 4 illustrate one example of modeling the path TRAJ1 of the vehicle 1 traveling in the center Δ1 of the first traffic lane VC1 of width L1 and drifting to the center Δ2 of the second traffic lane VC2, which is adjacent to the first lane VC1, by the module 6, and the path TRAJ2 of the vehicle 1 bringing the vehicle 1 back to the center Δ1 of the first lane VC1 from the point $P_{abort}$, the first and second traffic lanes VC1, VC2 being separated by a center line LC.

Although in this example the vehicle 1 drifts to its left in the direction of travel, as a variant, the vehicle 1 may drift to its right when the vehicle is traveling in the second traffic lane VC2 or indeed in driving-on-the-left mode.

The width L1 of the first traffic lane is determined by the optical acquisition means 7.

The vehicle 1 has a width W.

The curve TRAJ1 represents the path of the vehicle 1 for passing from the first traffic lane VC1 into the second lane VC2.

A reference frame linked to the lane VC1 is labeled R(O, X, Y), the origin O of which is in the center Δ1 of the lane VC1 before the vehicle 1 begins to drift, X is oriented according to the direction of movement of the vehicle 1 and Y is arranged so that the reference frame R is orthogonal.

The path of the vehicle 1 is determined in a straight line, the anticipator module 4 determining, on the basis of the curvature γff of the road, of the speed V of the vehicle and of the characteristics of the vehicle 1, notably the mass of the vehicle and the stiffness of the tires, the second steering command Uff.

During the maneuver for changing lane, at the point $P_{abort}$, the maneuver for changing lane is abandoned, the point $P_{abort}$ having $(x_{abort}; yl_{abort})$ as coordinates in the reference frame R.

From the point $P_{abort}$, the device 5 controls the vehicle 1 so that it follows the return path TRAJ2.

Reference is made more particularly to FIG. 4, which illustrates one example of modeling the paths TRAJ1 and TRAJ2 by the Bézier curves C1 and C2, respectively, in the reference frame R(O, X, Y).

It is assumed that the first Bézier curve C1 comprises four control points $P_0$, $P_1$, $P_2$ and $P_3$ of respective coordinates $(P_{0x}; P_{0y})$, $(P_{1x}; P_{1y})$, $(P_{2x}; P_{2y})$ and $P_{3x}; P_{3y})$ and has the equation:

$$P(s)=P_0(1-s)^3+3P_1s(1-s)^2+3P_2s^2(1-s)+P_3s^3 \qquad (5)$$

with s varying between 0 and 1.

It is assumed that the horizontal axis X represents the time variable x, which is representative of the evolution over time of the change in path, and the vertical axis Y represents the lateral position yl of the vehicle 1 with respect to the reference frame R(O, X, Y) of the lane VC1.

The predetermined duration Tp is equal to the value $P_{3x}$.

The vehicle 1 moves between the center C1 of the first lane VC1, corresponding to an initial lateral position $yl_{ini}$ defined by the coordinates of the control point $P_0$ arranged in the center C1, and a final position $yl_{fin}$ defined by the coordinates of the control point $P_3$ arranged in the center C2.

The following equation is obtained:

$$\begin{pmatrix} x \\ yl \end{pmatrix} = \begin{pmatrix} P_{0x} \\ P_{0y} \end{pmatrix}(1-s)^3 + 3\begin{pmatrix} P_{1x} \\ P_{1y} \end{pmatrix}s(1-s)^2 + 3\begin{pmatrix} P_{2x} \\ P_{2y} \end{pmatrix}s^2(1-s) + \begin{pmatrix} P_{3x} \\ P_{3y} \end{pmatrix}s^3 \qquad (6)$$

As a variant, the Bézier curve may comprise more than four control points so as to improve the precision of the modeling of the path TRAJ1.

By discretizing equation (6) by introducing the variable i varying from 0 to N, for each instant $x_i$, equation (6) is equal to:

$$\begin{pmatrix} x_i \\ yl_i \end{pmatrix} = \qquad (7)$$

$$\begin{pmatrix} P_{0x} \\ P_{0y} \end{pmatrix}(1-s_i)^3 + 3\begin{pmatrix} P_{1x} \\ P_{1y} \end{pmatrix}s_i(1-s_i)^2 + 3\begin{pmatrix} P_{2x} \\ P_{2y} \end{pmatrix}s_i^2(1-s_i) + \begin{pmatrix} P_{3x} \\ P_{3y} \end{pmatrix}s_i^3$$

The second Bézier curve C2 comprises four control points, a first control point $P_{abort}$, a second control point P4, a third control point P5 and a fourth control point P6 so that:

$$P_{abortx}=0 \qquad (8)$$

$$P_{aborty}=yl_{abort} \qquad (9)$$

so as to ensure continuity between the first and second Bézier curves C1, C2;

$$P_{4x}=P_{2x}-x_{abort} \qquad (10)$$

$$P_{4y}=P_{aborty}-P_{4x}\cdot \dot{y}l_{abort} \qquad (11)$$

so as to ensure continuity of the lateral speed $\dot{y}l$ of the vehicle when switching from the path TRAJ1 for changing traffic lane to the path TRAJ2 for returning to the center $\Delta 1$ of the first traffic lane VC1 by minimizing the lateral deviation yl when the vehicle 1 returns to the center of said first lane, where $\dot{y}l_{abort}$ is the lateral speed at the instant $(x=x_{abort})$ when the change of lane is abandoned;

$$P_{5x} = \frac{1}{2}\cdot(P_{6x} + P_{4x}) \qquad (12)$$

$$P_{6x}=P_{3x}-x_{abort} \qquad (13)$$

so that the duration Tc of the change of lane made by the vehicle 1 and the duration Tr of the return of the vehicle to the first traffic lane VC1 is equal to the predetermined duration Tp and the maneuver therefore does not last longer than initially anticipated.

Let $$P_{5y}=0 \qquad (14);$$

$$P_{6y}=0 \qquad (15)$$

corresponding to the coordinates of the center $\Delta 1$ of the lane VC1.

So that the wheels of vehicle 1 do not cross the center line LC, the maximum value of $P_{4y}$ is below or equal to a control threshold Sc which is dependent on the traffic lane in which the vehicle 1 is traveling when the change of traffic lane is abandoned.

When the vehicle drifts to its left in the direction of travel when a change of lane is abandoned, for example when the vehicle 1 is traveling in the first traffic lane VC1 when a change of lane is abandoned, the control threshold Sc expressed in meters is equal to:

$$Sc = \frac{1}{2}L1 - \frac{1}{2}W + Sa \qquad (16)$$

where Sa is an adjustment threshold which makes it possible to adjust, for example empirically, the position of the wheels of the vehicle 1 with respect to the center line LC, the width L1 of the first traffic lane and the width W of the vehicle 1 being expressed in meters. The threshold Sa may be zero.

When the vehicle drifts to its right in the direction of travel when a change of lane is abandoned, for example when the vehicle 1 is traveling in the second traffic lane VC2 when a change of lane is abandoned, the control threshold Sc is equal to:

$$Sc = -\frac{1}{2}L1 + \frac{1}{2}W - Sa \qquad (17)$$

It is noted that the signs preceding the width L1, the width W and the threshold Sa are reversed in equations (16) and (17) according to whether the vehicle 1 is drifting to its left or its right according to the direction of travel of the vehicle 1.

Analogously to the first curve C1, the second Bézier curve C2 has the equation:

$$\begin{pmatrix} x_i \\ yl2_i \end{pmatrix} = \qquad (18)$$

$$\begin{pmatrix} 0 \\ yl_{abort} \end{pmatrix}(1-s_i)^3 + 3\begin{pmatrix} P_{4x} \\ p_{4y} \end{pmatrix}s_i(1-s_i)^2 + 3\begin{pmatrix} P_{5x} \\ 0 \end{pmatrix}s_i^2(1-s_i) + \begin{pmatrix} P_{6x} \\ 0 \end{pmatrix}s_i^3$$

the variable i varying from 0 to N, for each instant $x_i$.

The module 6 comprises the means for modeling the path TRAJ2 comprise, for example, a processing unit UT determining the equation (18) of the second curve C2 on the basis of equations (8) to (15), the processing unit UT determining the control threshold Sc according to equations (16) and (17), and saturating the value of the time variable $P_{4y}$ of the second control point $P_4$ so that the maximum value of said variable is below or equal to the control threshold Sc.

Furthermore, the processing unit UT implements the equation (7) of the first curve C1 and the equation (17) of the second curve C2.

The first parameter S comprises all of the discretization parameters $S_i$, i varying from 1 to N, N being an integer.

The number N is chosen so that it is large enough to obtain paths of the vehicle 1 on the basis of the curves C1 and C2 which are not excessively discretized so as not to slow down the control loop Br and be detrimental to the comfort of the passengers, and so that it is not excessively large in order to minimize the computing load of the processing unit UT.

N is, for example, equal to 50, the curves C1 and C2 being discretized into 50 points.

Of course, the value of N may be different from 50.

The value of N may be chosen so as not to excessively discretize the path, the value of N being, for example, greater than 30.

Furthermore, the value of N may be chosen so as not to overload the processing unit UT, the value of N being, for example, less than 100.

The module 6 further comprises a time counter CP, the module 6 triggering the counter CP during the change of path lane and stopping the counter when the value reached by the counter is greater than or equal to the value of the time variable x associated with the control point $P_3$ of the first Bézier curve C1 comprising the largest value of the time variable $P_{3x}$, the duration elapsed between the triggering and the stopping of the counter CP being equal to the predetermined duration Tp.

The counter CP operates with a period Tn.

The period Tn is chosen according to the operating frequency of the module 6 and of the loop Br.

The period Tn is, for example, equal to 10 ms.

Figure 5:
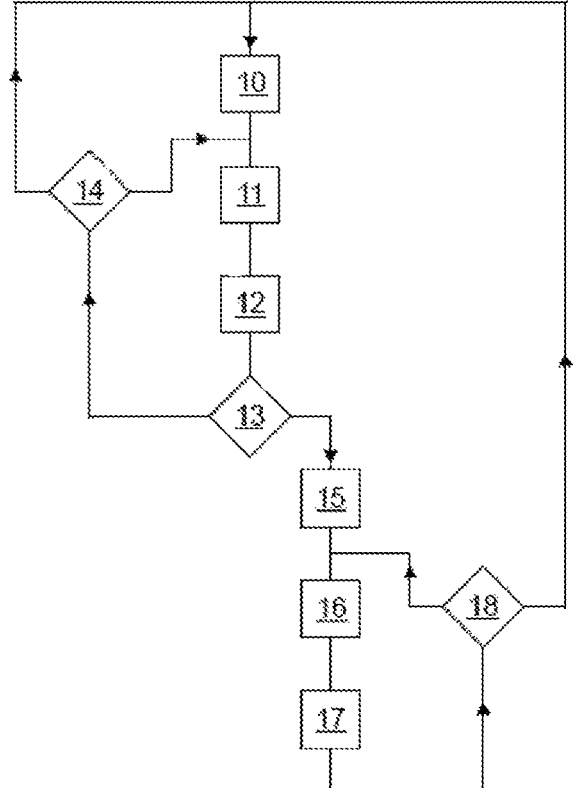
FIG. 5 illustrates one way of implementing the path control device of a vehicle, according to the invention.

FIG. 5 illustrates one example of an implementation of the device 5 for path control during the change of traffic lane.

It is assumed that equation (7) and the control points $P_0$, $P_1$, $P_2$ and $P_3$ are stored in a memory MEM of the module 6.

During the following step, 10, the change of traffic lane is initiated.

Then, in a step 11, the module 6 triggers the counter CP.

For each increment Tn of the counter, the module 6 determines the setpoint state vector ξ* on the basis of the lateral deviation $yl_i$, of the time variable $x_i$ and of the discretization parameter $S_i$.

The setpoint state vector ξ* comprises setpoint values comprising the setpoint yaw rate $\dot{\Psi}$ref, a setpoint heading angle $\Psi_{ref}$, and a setpoint lateral speed $yl_{ref}$ and the setpoint lateral deviation $yl_{ref}$.

The setpoint steering angle δref, the variation in the steering angle δ̇ref and the integral of the setpoint lateral position ∫−ylref are equal to zero.

Two consecutive increments are separated by the duration Tn.

The module 6 determines a value of the discretization parameter $S_i$ so that each increment Tn of the time counter Cp is between two consecutive time variables $x_i$ and $x_{i+1}$.

Then the module 6 determines the two consecutive laterals $yl_i$ and $yl_{i+1}$ on the basis of the value of the discretization parameter $S_i$.

The module 6 determines an intermediate second lateral deviation $yl_i$ by interpolating the two consecutive lateral deviations $yl_i$ and $yl_{i+1}$.

Then the module 6 determines setpoint values according to the following equations:

$$\dot{yl}_{ref} = \frac{yl_{i+1} - yl_i}{x_{i+1} - xi} \tag{19}$$

$$\dot{\psi}_{ref} = \frac{a_{lat}}{V} \tag{20}$$

where V is the longitudinal speed of the vehicle 1 and $a_{lat}$ is the instantaneous lateral acceleration of the path, which is equal to:

$$a_{lat} = \frac{yl_{i+2} - 2yl_{i+1} + yl_i}{x_{i+1} - x_i} \tag{21}$$

$$\text{and } \psi_{ref} = \frac{yl_{ref}}{V} \tag{22}$$

The setpoint lateral deviation $yl_{ref}$ is equal to:

$$\begin{cases} yl_{ref} = yl1\,l \text{ when the vehicle is moving in the} & (23) \\ \qquad \text{first traffic lane } VC1VC1 \\ yl_{ref} = yl1 - yl_{fin} \text{ after change of lane:} \\ \text{when the vehicle is moving in the second traffic lane } VC2 \end{cases}$$

During an optional step 12, when the module 6 comprises means for determining a corrective radius of curvature $\rho_{SALC}$, the module 6 determines the corrective radius of curvature on the basis of the instantaneous lateral acceleration $a_{lat}$, of the lateral speed ẏl, and of the longitudinal speed V of the vehicle according to the following equation:

$$\rho_{SALC} = \frac{V a_{lat} - \dot{y}_l a_{lat}}{\left(V^2 + \dot{y}_l^2\right)^{\frac{3}{2}}} \tag{24}$$

The value of the corrective radius of curvature $\rho_{SALC}$ is transmitted to the anticipator module 4 and added to the second command Uff making it possible to improve the path-following dynamics.

If no order to abandon the change of lane has been issued (step 13) and if the change of lane has not been completed (step 14), the method proceeds to step 11.

If no order to abandon the change of lane has been issued (step 13) and the change of lane has been completed (step 14), the method proceeds to step 10.

When the change of traffic lane is abandoned (step 13), during the following step, 15, the module 6 models the return path TRAJ2 of the vehicle 1 to the center of the first traffic lane VC1. This modeling is carried out by means of the second Bézier curve C2 by determining the four control points $P_{abort}$, P4, P5 and P6 as described previously.

The lateral speed $\dot{yl}_{abort}$ at the instant when the change of lane is abandoned is approximated by equation (19) using the two consecutive lateral deviations $yl_i$ and $yl_{i+1}$ the time values $x_i$ and $x_{i+1}$ of which are closest to the instant $x_{abort}$ when the change of lane is abandoned.

Then, during a step 16, for each Tn of the counter CP, the module 6 determines the second state vector $\xi^*_1$ comprising second setpoint values comprising a second setpoint yaw rate $\dot{\Psi}_2$, a second setpoint heading angle $\Psi_2$, and a second setpoint lateral speed $\dot{yl}_2$ and a second setpoint lateral deviation $yl2_{ref}$.

The remaining second setpoint values are equal to zero.

The module 6 determines the value of the discretization parameter $S_i$ so that each increment Tn of the time counter Cp is between two consecutive time variables $x_i$ and $x_{i+1}$.

Then the module 6 determines the two consecutive lateral deviations $yl2_i$ and $yl2_{i+1}$ on the basis of the value of the discretization parameter $S_i$.

The module 6 determines setpoint values according to the following equations:

$$\dot{yl2}_{ref} = \frac{yl2_{i+1} - yl2_i}{x_{i+1} - x_i} \tag{25}$$

$$\dot{\psi}_2 = \frac{a_{lat2}}{V} \tag{26}$$

where $a_{lat2}$ is the second instantaneous lateral acceleration of the path, which is equal to:

$$a_{lat2} = \frac{yl2_{i+2} - 2yl2_{i+1} + yl2_i}{x_{i+1} - x_i} \tag{27}$$

$$\psi_2 = \frac{yl2_{ref}}{V} \tag{28}$$

The second setpoint lateral deviation $yl2_{ref}$ is equal to the lateral position of the center of the first traffic lane VC1.

During an optional step 17, the module 6 may determine the corrective radius of curvature $\rho_{SALC}$ on the basis of the instantaneous lateral acceleration $a_{lat}$, the second lateral speed $\dot{y}l2$, and of the longitudinal speed V of the vehicle according to the following equation:

$$p_{SALC} = \frac{V \cdot a_{lat2} - \dot{y}l2 \cdot a_{lat2}}{\left(V^2 + \dot{y}l2^2\right)^{\frac{3}{2}}} \qquad (29)$$

The value of the corrective radius of curvature $\rho_{SALC}$ is transmitted to the anticipator module 4 and added to the second command Uff making it possible to improve the path-following dynamics.

As long as the vehicle 1 is not traveling in the center of the traffic lane VC1 and the value reached by the counter CP is not greater than the value $P_{3x}$ of the control point $P_3$ (step 18), the method proceeds to step 16.

When the vehicle is, for example, in the center of the traffic lane VC1 or the value reached by the counter CP is greater than or equal to the value $P_{3x}$ (step 18), the maneuver for returning to the center of the traffic lane VC1 is complete. The method proceeds to step 10.

As a variant, when the absolute value of the lateral deviation yl is below a threshold for a predetermined duration, the maneuver for returning to the center of the traffic lane VC1 is complete.

The threshold is, for example, equal to 10 cm and the predetermined duration is, for example, equal to 2 seconds.

If the vehicle 1 is not completely aligned with the center $\Delta1$ of the first lane VC1 at the end of the change in path, the control loop Br subsequently aligns the vehicle 1 with the center $\Delta1$.

As a variant, for example when the environment in which the vehicle 1 is moving becomes complex, if the vehicle 1 has crossed the center line LC when the change of traffic lane is abandoned (step 13), the device 5 is deactivated and the driver regains control of the vehicle 1.

Figure 6:
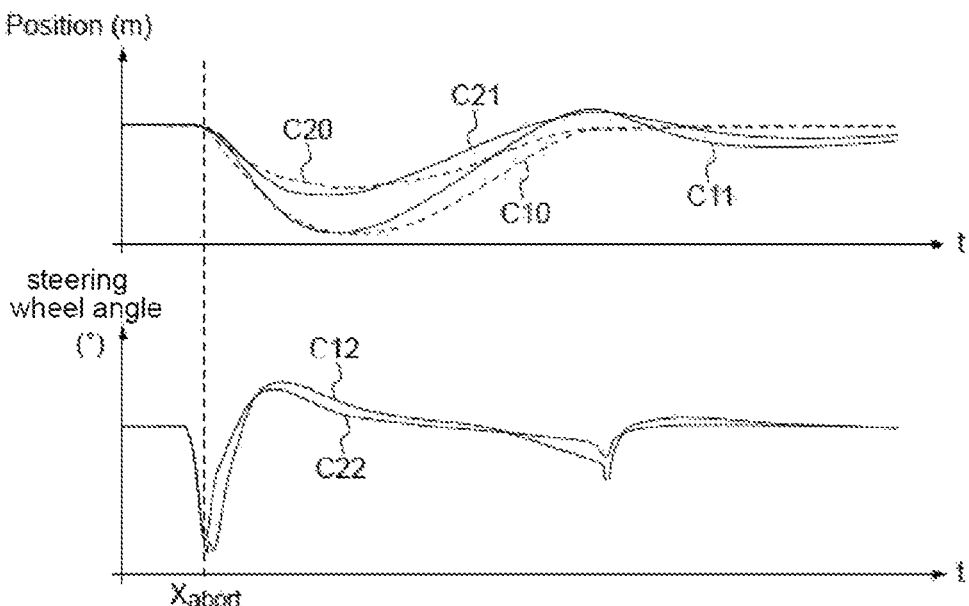
FIG. 6 shows the evolution over time of the setpoint lateral deviation, of the lateral deviation and of the angle of the wheels following the action of the control device according to the invention.

FIG. 6 shows the evolution over time of the second setpoint lateral deviation and the second lateral deviation of the vehicle 1 with respect to the center of the traffic lane of the vehicle 1 which are determined by a path control device known from the prior art (curves C10 and C11), and for the device 5 (curves C20 and C21), and the evolution over time of the steering wheel angle of the vehicle 1 equipped with a path control device known from the prior art (curve C12) and for the device 5 (curve C22) during a change of traffic lane to the right of the vehicle 1 then a return to the center of the traffic lane of the vehicle 1, the vehicle traveling at the speed V of 90 kph.

Up to the instant $(x_{abort})$ when the change of lane is abandoned, the curves C10 and C20 representing the second setpoint lateral deviation, the curves C11 and C21 representing the second lateral deviation of the vehicle 1 with respect to the center of the traffic lane, and the curves representing the steering wheel angle of the vehicle 1 which are determined from the path control device known from the prior art and by the device 5 are superimposed.

From the instant $x_{abort}$ when the maneuver for changing lane is abandoned, the curves C20 and C21 and C22 have a smaller amplitude than the curves C10, C11 and C12.

It is noted that the definition of the coordinate $P_{4y}$ according to equations (11), (16) and (17) makes it possible to reduce the lateral position of the vehicle 1 equipped with the device 5 with respect to the lateral position of the vehicle 1 equipped with a device known from the prior art during the maneuver of the return of the vehicle 1 to the center of its traffic lane, notably improving the comfort of the passengers of the vehicle 1.

The invention claimed is:

1. A path control method for a motor vehicle, comprising:
   controlling the vehicle based on a first setpoint state vector during a change of traffic lane so that the vehicle traveling in a first traffic lane drifts into a second traffic lane in a predetermined duration, the path of the vehicle during the change of traffic lane being modeled by a first Bézier curve linking a value of a discretization parameter to a value of a first lateral deviation of the vehicle with respect to a center of a traffic lane and to a value of a time variable which is representative of an evolution of a change in path;
   controlling the vehicle based on a second setpoint state vector when the change of traffic lane is abandoned so that the vehicle traveling in the first traffic lane drifts to the center of said first lane, a return path of the vehicle to the center of the first traffic lane being modeled by a second Bézier curve parameterized based on the value of the time variable at an instant when the change of lane is abandoned, of the value of the lateral deviation associated by the first Bézier curve with said value, and of parameters of the first Bézier curve,
   wherein the second Bézier curve is further parametrized based on a lateral position and on a lateral speed of the path for changing traffic lane from the first lane to the second lane at the instant when the change of lane is abandoned, and
   wherein modeling the return path of the vehicle to the center of the first traffic lane when the change of traffic lane is abandoned by the second Bézier curve comprises determining at least four control points of the second Bézier curve, each control point being identified by a value of the time variable and a lateral deviation value,
   the value of the time variable of a first control point being zero, and the lateral deviation value of the first control point being equal to the value of the lateral deviation associated by the first Bézier curve with the instant when the change of lane is abandoned,
   the value of the time variable of a second control point being determined based on the value of the time variable of a control point of the first Bézier curve and on the instant when the change of lane is abandoned, and the lateral deviation value of the second control point being determined based on the value of the time variable of a control point of the first Bézier curve, of the lateral position and of the lateral speed of the path for changing traffic lane at the instant when the change of lane is abandoned, and
   the third and fourth control points being determined so that a sum of a duration of the change of traffic lane made by the vehicle and of a duration of the return of the vehicle to the first traffic lane is equal to the predetermined duration.

2. The method as claimed in claim 1, wherein the value of the time variable of the third control point is equal to the average of the values of the time variable of the second and fourth control points of the second Bézier curve.

3. The method as claimed in claim 1, wherein a maximum value of the time variable of the second control point is below or equal to a control threshold so that the vehicle does not cross the center line separating the first and second traffic lanes.

4. The method as claimed in claim 3, wherein the control threshold is determined based on a width of the traffic lane of the vehicle, on a width of the vehicle, and on an adjustment threshold.

5. A path calculation module for a motor vehicle, comprising:

means for transmitting a first setpoint state vector as input to a closed control loop of a path control device, the loop being configured to control the motor vehicle so that the vehicle traveling in a first traffic lane drifts into a second traffic lane in a predetermined duration, the path being modeled by a first Bézier curve linking a value of a discretization parameter to a value of a lateral deviation of the vehicle with respect to a center of a traffic lane in which the vehicle is moving and to a value of a time variable which is representative of an evolution of a change in the path, the vector being determined based on the lateral deviation, on the time variable, and on the discretization parameter, means for modeling a return path of the vehicle to the center of the first traffic lane when a change of traffic lane is abandoned by a second Bézier curve based on the value of a time variable at an instant when the change of traffic lane is abandoned, on the value of the lateral deviation associated by the first Bézier curve with said value, and on parameters of the first Bézier curve, means for determining a second setpoint state vector of the closed control loop of the path control device so that the vehicle returns to traveling in the center of the first lane, and means for transmitting the second setpoint state vector as input to the loop, wherein the second Bézier curve is further parametrized based on a lateral position and on a lateral speed of the path for changing traffic lane from the first lane to the second lane at the instant when the change of lane is abandoned, and wherein the second Bézier curve is parameterized by at least four control points, each control point being identified by a value of the time variable and a lateral deviation value, and the means for modeling a return path of the vehicle to the center of the first traffic lane when the change of traffic lane is abandoned being configured to determine the four control points so that:

the value of the time variable of a first control point is zero, and the lateral deviation value of the first control point is equal to the value of the lateral deviation associated by the first Bézier curve with the instant when the change of lane is abandoned, the value of the time variable of a second control point is determined based on the value of a control point of the first Bézier curve and on the instant when the change of lane is abandoned, and the lateral deviation value of the second control point is determined based on the value of the time variable of a control point of the first Bézier curve, on the lateral position, and on the lateral speed of the path for changing traffic lane at the instant when the change of lane is abandoned, and the third and fourth control points are determined so that a sum of a duration of the change of traffic lane made by the vehicle and of a duration of the return of the vehicle to the first traffic lane is equal to the predetermined duration.

6. The calculation module as claimed in claim 5, wherein the value of the time variable of the third control point is equal to the average of the values of the time variable of the second and fourth control points of the second Bézier curve.

7. The calculation module as claimed in claim 5, wherein the means for modeling a return path are further configured to determine a control threshold so that the vehicle does not cross the center line separating the first and second traffic lanes, and saturate the value of the time variable of the second control point so that the maximum value of said variable is below or equal to the control threshold.

8. The calculation module as claimed in claim 7, wherein the means for modeling a return path are configured to determine the control threshold based on a width of the traffic lane of the vehicle, on a width of the vehicle, and on an adjustment threshold.

9. A path control device comprising the calculation module as claimed in claim 5, and a closed control loop configured to successively receive as setpoints the first and second setpoint state vectors transmitted by the path calculation module, the control loop being further configured to control the motor vehicle so that the motor vehicle follows the paths modeled by the first and second Bézier curves.

* * * * *